(12) United States Patent
Arai et al.

(10) Patent No.: US 9,576,600 B2
(45) Date of Patent: Feb. 21, 2017

(54) FLEXURE OF DISK DRIVE SUSPENSION

(71) Applicant: NHK SPRING CO., LTD., Yokohama-shi, Kanagawa (JP)

(72) Inventors: Hajime Arai, Aiko-gun (JP); Futa Sasaki, Aiko-gun (JP)

(73) Assignee: NHK SPRING CO., LTD., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/788,404

(22) Filed: Jun. 30, 2015

(65) Prior Publication Data

US 2016/0012839 A1 Jan. 14, 2016

(30) Foreign Application Priority Data

Jul. 11, 2014 (JP) .................. 2014-143035

(51) Int. Cl.
G11B 5/40 (2006.01)
G11B 5/48 (2006.01)

(52) U.S. Cl.
CPC ................. *G11B 5/48* (2013.01); *G11B 5/486* (2013.01); *G11B 5/4826* (2013.01); *G11B 5/4833* (2013.01); *G11B 5/4846* (2013.01); *G11B 5/40* (2013.01)

(58) Field of Classification Search
None
See application file for complete search history.

(56) References Cited

U.S. PATENT DOCUMENTS

| 6,872,896 | B1 | 3/2005 | Young et al. |
| 7,630,174 | B2 | 12/2009 | Sheng et al. |
| 8,295,013 | B1 | 10/2012 | Pan et al. |
| 8,320,084 | B1 | 11/2012 | Shum et al. |
| 8,325,446 | B1 | 12/2012 | Liu et al. |
| 8,395,866 | B1 | 3/2013 | Schreiber et al. |
| 8,462,466 | B2 * | 6/2013 | Huber ............ G11B 5/4806 360/245.9 |
| 8,477,459 | B1 | 7/2013 | Pan |

(Continued)

FOREIGN PATENT DOCUMENTS

| JP | 2013211074 A | 10/2013 |
| WO | 2008051602 A2 | 5/2008 |

OTHER PUBLICATIONS

U.S. Appl. No. 14/788,294, First Named Inventor: Hajime Arai, filed Jun. 30, 2015, Title: "Flexure of Disk Drive Suspension".

(Continued)

*Primary Examiner* — Carlos E Garcia
(74) *Attorney, Agent, or Firm* — Holtz, Holtz & Volek PC

(57) ABSTRACT

A tail pad portion is provided in a flexure tail including a metal base and a conductive circuit portion. Tail terminals are arranged in the tail pad portion. The metal base is made of stainless steel, and includes a frame structure having a first frame and a second frame. An opening is formed between the first and second frames. The tail terminals are arranged parallel to each other between the first and second frames. A bridge portion is provided between the first and second frames. The bridge portion is constituted of at least one conductive bridge member, and arranged at a position which does not overlap the tail terminals. One end of the bridge member is connected to the first frame, and the other end of the bridge member is connected to the second frame.

12 Claims, 15 Drawing Sheets

(56) References Cited

U.S. PATENT DOCUMENTS

| | | |
|---|---|---|
| 8,665,566 B1 | 3/2014 | Pan et al. |
| 8,995,090 B2 * | 3/2015 | Nishiyama .............. G11B 5/486 |
| | | 360/234.5 |
| 9,064,516 B2 | 6/2015 | Arai et al. |
| 9,117,467 B1 | 8/2015 | Teng et al. |
| 9,449,624 B2 | 9/2016 | Arai et al. |
| 2002/0114107 A1 | 8/2002 | Traskos et al. |
| 2005/0122627 A1 * | 6/2005 | Kanagawa .............. G11B 5/486 |
| | | 360/245.9 |
| 2006/0023338 A1 | 2/2006 | Sharma et al. |
| 2007/0171576 A1 | 7/2007 | Sheng et al. |
| 2009/0207529 A1 | 8/2009 | Yao |
| 2014/0160906 A1 | 6/2014 | Yamada |
| 2016/0012837 A1 | 1/2016 | Arai et al. |
| 2016/0012838 A1 | 1/2016 | Arai et al. |
| 2016/0254013 A1 | 9/2016 | Arai et al. |

OTHER PUBLICATIONS

U.S. Appl. No. 14/788,357, First Named Inventor: Hajime Arai, filed Jun. 30, 2015, Title: "Flexure of Disk Drive Suspension".

\* cited by examiner

FLEXURE OF DISK DRIVE SUSPENSION

CROSS-REFERENCE TO RELATED APPLICATIONS

This application is based upon and claims the benefit of priority from prior Japanese Patent Application No. 2014-143035, filed Jul. 11, 2014, the entire contents of which are incorporated herein by reference.

BACKGROUND OF THE INVENTION

1. Field of the Invention

The present invention relates to a flexure of a disk drive suspension, and more particularly, a flexure tail comprising a tail pad portion.

2. Description of the Related Art

A hard disk drive (HDD) is used in an information processor such as a personal computer. The HDD comprises a magnetic disk rotatable about a spindle, a carriage turnable about a pivot, etc. On an arm of the carriage, a disk drive suspension (which will be hereinafter simply referred to as a suspension) is provided.

The suspension comprises elements such as a load beam, and a flexure disposed to overlap the load beam. A magnetic head including a slider is mounted on a gimbal portion formed near a distal end of the flexure. The magnetic head is provided with elements for accessing data, that is, for reading or writing data. The load beam and the flexure, etc., constitute a head gimbal assembly.

Various types of flexures have been put to practical use according to the required specification. As an instance, a flexure with conductors as disclosed in U.S. Pat. No. 8,325,446 (Patent Document 1) or U.S. Pat. No. 8,295,013 (Patent Document 2) is known. The flexure with conductors includes a metal base made of a thin stainless steel plate, an insulating layer made of an electrically insulating material, such as polyimide, which is formed on the metal base, a plurality of conductors formed on the insulating layer. The flexure includes a proximal portion which overlaps the load beam, and a flexure tail which extends toward the rear of a baseplate.

Part of the conductors is for writing, and the other part of the same is for reading. Ends of these conductors are connected to elements (for example, MR elements) provided in the magnetic head. The other ends of the conductors are connected to tail terminals formed in the flexure tail. These tail terminals are electrically connected to terminals of a circuit board such as a flexible printed circuit (FPC). On the circuit board, a signal processing circuit such as a preamplifier is mounted.

In a tail pad portion provided in the flexure tail, a plurality of tail terminals are arranged. These tail terminals are connected to conductors which constitute a conductive circuit portion of the flexure. The tail terminals are laid over the terminals of the circuit board, and the tail terminals and the terminals of the circuit board are electrically connected by bonding means such as ultrasonic bonding.

As a result of the intensive study of the inventors of the present invention, in a flexure tail having the tail terminals as described above, it has been found that crosstalk (a leakage current) occurs in a read conductor when a pulse signal is passed to a write conductor. The crosstalk becomes a cause of the electrical characteristics of the disk drive to be adversely affected.

BRIEF SUMMARY OF THE INVENTION

Accordingly, the object of the present invention is to provide a flexure of a disk drive suspension capable of reducing occurrence of crosstalk.

An example of an embodiment is a flexure of a disk drive suspension with a magnetic head mounted therein, which comprises a metal base and a conductive circuit portion formed along the metal base, and in which a tail pad portion formed in a flexure tail at an end of the flexure includes a frame structure, a tail terminal group, and a conductive bridge portion. The frame structure includes a first frame and a second frame which are a part of the metal base and extend in the longitudinal direction of the tail pad portion, and in which an opening is formed between the first and second frames. Further, the distal ends of the first and second frames are separated from each other. The tail terminal group comprises a plurality of tail terminals arranged in the tail pad portion in which the terminals are arranged to be spaced apart from each other in the longitudinal direction of the tail pad portion, and each of the tail terminals traverses the opening of the frame structure. The bridge portion comprises at least one bridge member. The at least one bridge member is arranged between the tail terminals which are adjacent to each other between the first and second frames, and electrically connects the first and second frames to each other.

According to the structure of this embodiment, in the flexure of the disk drive suspension comprising the flexure tail including the tail pad portion, crosstalk can be reduced, and the electrical characteristics of the disk drive can be improved.

According to one embodiment, the at least one bridge member is made of a metal which is the same material as the tail terminals. The bridge member is formed at a position which does not overlap the tail terminals in the thickness direction. The bridge member may be formed at a position closer to the distal ends of the first and second frames than to the tail terminal group.

The bridge member may be arranged between selected specific tail terminals of all of the tail terminals which constitute the tail terminal group. In one embodiment, the tail terminal group includes a pair of write tail terminals, and the at least one bridge member is arranged between the write tail terminals. The tail terminal group includes a pair of read tail terminals, and the at least one bridge member may be arranged between the read tail terminals. Further, the tail terminal group includes a pair of sensor tail terminals, and the at least one bridge member may be arranged between the sensor tail terminals.

Also, the tail terminal group includes a pair of write tail terminals and a pair of read tail terminals, and the at least one bridge member may be arranged between the pair of write tail terminals and the pair of read tail terminals. Alternatively, the tail terminal group includes a pair of sensor tail terminals, and the at least one bridge member may be arranged between the pair of sensor tail terminals and the pair of read tail terminals. The at least one bridge member may be arranged between the pair of sensor tail terminals and the pair of write tail terminals. In another embodiment, each bridge member may be arranged between all adjacent tail terminals which constitute the tail terminal group.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A flexure of a disk drive suspension according to a first embodiment will be hereinafter described with reference to FIGS. 1 to 10.

Figure 1:
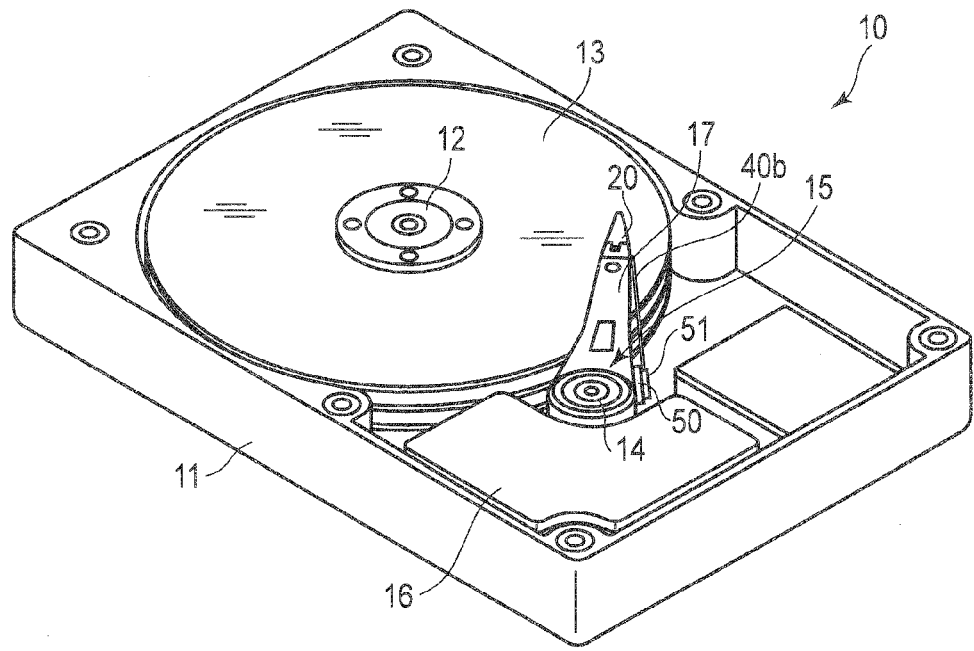
FIG. 1 is a perspective view showing an example of a disk drive comprising a suspension.

A hard disk drive (HOD) 10 shown in FIG. 1 comprises a case 11, disks 13 rotatable about a spindle 12, a carriage 15 turnable about a pivot 14, and a positioning motor 16 for turning the carriage 15. The case 11 is sealed by a lid (not shown).

Figure 2:
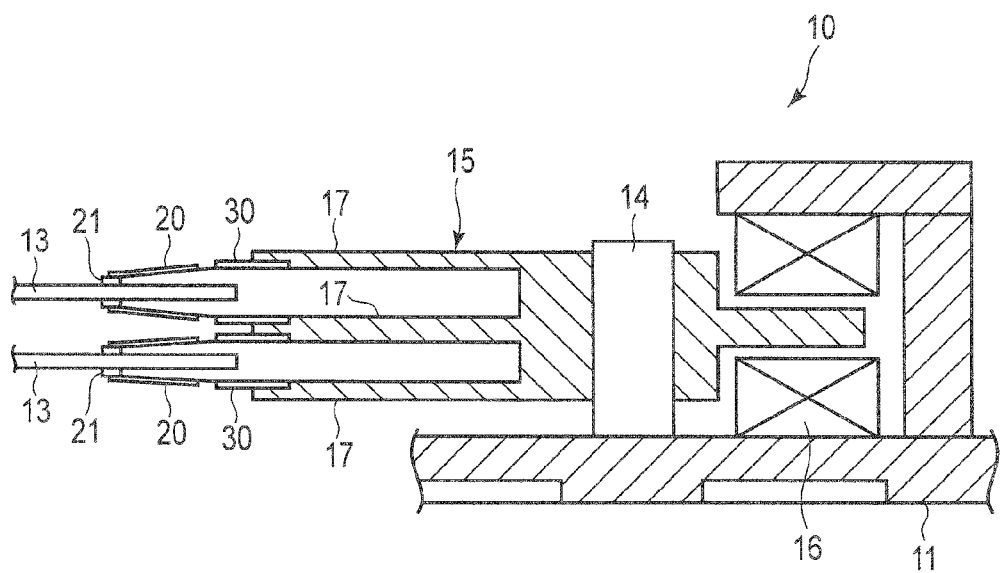
FIG. 2 is a partial cross-sectional view of the disk drive shown in FIG. 1.

FIG. 2 is a cross-sectional view schematically showing a part of the disk drive 10. The carriage 15 is provided with arms 17. At a distal end portion of each arm 17, a disk drive suspension (hereinafter simply referred to as a suspension) 20 is mounted. At a distal end of the suspension 20, a slider 21 which serves as a magnetic head is provided. As each disk 13 rotates at high speed, an air bearing is formed between the disk 13 and the slider 21.

If the carriage 15 is turned by the positioning motor 16, the suspension 20 moves radially relative to the disk 13, and the slider 21 thereby moves to a desired track of the disk 13. The slider 21 is provided with a magnetic coil for recording data on the disk 13, magnetoresistive (MR) elements for reading data recorded on the disk 13, a heater, etc. The MR elements convert a magnetic signal recorded on the disk 13 into an electrical signal.

Figure 3:
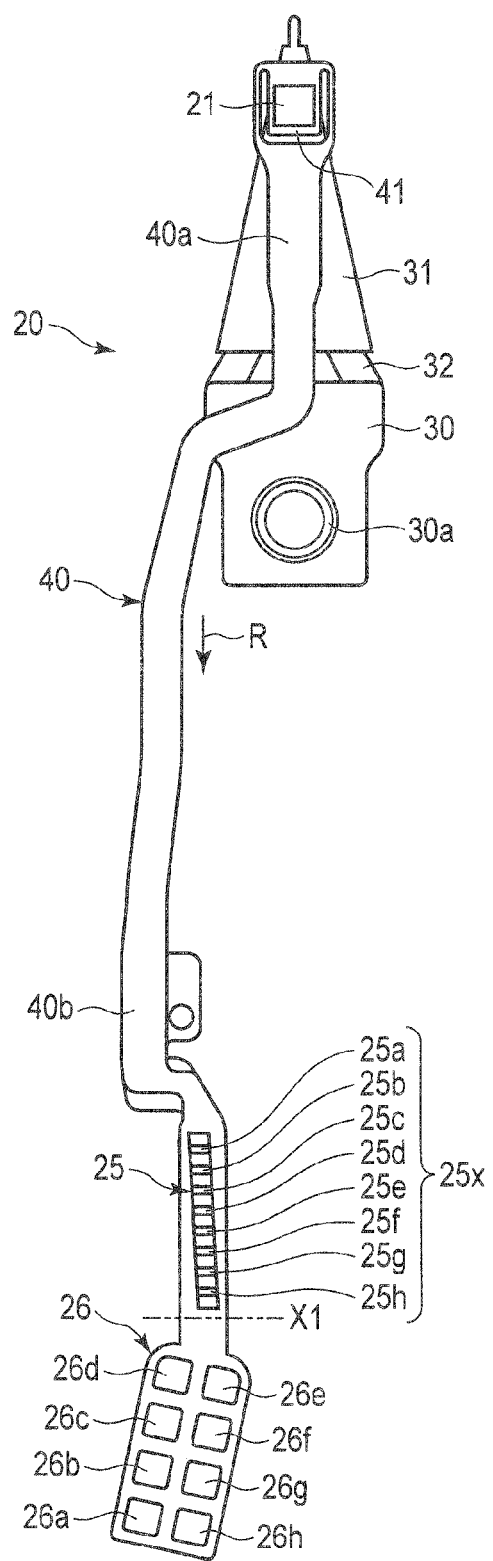
FIG. 3 is a plan view showing an example of a suspension including a test pad.

FIG. 3 shows an example of the suspension 20 comprising a tail pad portion 25 and a test pad 26. The suspension 20 comprises a baseplate 30, a load beam 31, a hinge member 32, and a flexure 40 with conductors. The flexure 40 with conductors may be simply referred to as the flexure 40. A boss portion 30a of the baseplate 30 is secured to the arm 17 (FIGS. 1 and 2) of the carriage 15. A tongue 41 (FIG. 3) is formed near a distal end of the flexure 40. The slider 21 is mounted on the tongue 41.

As shown in FIG. 3, the flexure 40 includes a proximal portion 40a overlapping the load beam 31, and a flexure tail 40b extending toward the back (i.e., in the direction indicated by arrow R) of the baseplate 30 from the proximal portion 40a. The proximal portion 40a of the flexure 40 is secured to the load beam 31 by fixing means such as laser welding. The flexure tail 40b is provided with the tail pad portion 25 and the test pad 26. Tail terminals 25a to 25h are provided in the tail pad portion 25. These tail terminals 25a to 25h constitute a tail terminal group 25x.

Test terminals 26a to 26h are provided in the test pad 26. The test terminals 26a to 26h are electrically connected to the tail terminals 25a to 25h, respectively. An example of the test pad 26 is constituted of the ground terminal 26a, the sensor terminals 26b and 26c, the read terminals 26d and 26e, the heater terminal 26f, and the write terminals 26g and 26h. Although the way in which the test terminals 26a to 26h are arranged is arbitrary, in the example shown in FIG. 3, the test terminals 26a to 26h are arranged in two rows. The electrical characteristics, etc., of the magnetic head (the slider 21) are inspected by using the test terminals 26a to 26h. After inspection has been carried out, the test pad 26 is cut off from the flexure tail 40b at cutoff portion X1 (shown by two-dot chain line in FIG. 3).

Figure 4:
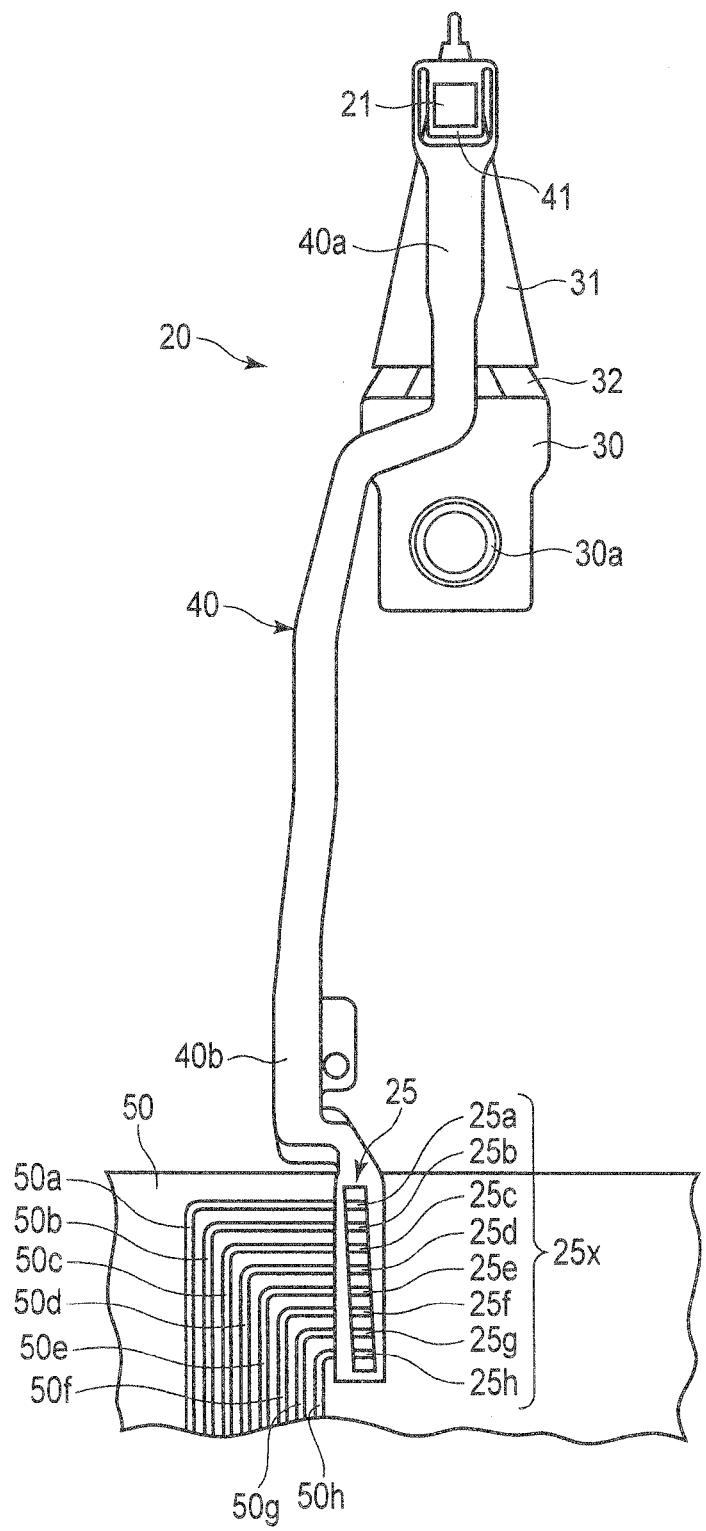
FIG. 4 is a plan view showing the state in which the test pad of the suspension shown in FIG. 3 is cut off, and tail terminals are connected to a circuit board.

FIG. 4 shows the flexure 40 in which the test pad 26 is cut off and the tail pad portion 25 remains. In the tail pad portion 25, the tail terminal group 25x constituted of the tail terminals 25a to 25h is formed. The tail terminals 25a to 25h are connected to conductors 50a to 50h of a circuit board 50, respectively. An example of the circuit board 50 is a flexible printed circuit (FPC).

On the circuit board 50, a preamplifier 51 (FIG. 1) which constitutes a part of a signal processing circuit is mounted. A read circuit of the preamplifier 51 is connected to the tail terminals 25d and 25e via the read conductors 50d and 50e. A write circuit of the preamplifier 51 is connected to the tail terminals 25g and 25h via the write conductors 50g and 50h.

A write current which is output from the preamplifier 51 is supplied to the magnetic coil of the slider 21 via the write tail terminals 25g and 25h. An electrical signal detected by the MR elements of the slider 21 is input to the preamplifier 51 via the read tail terminals 25d and 25e. The current flowing in the write tail terminals 25g and 25h is greater than that flowing in the read tail terminals 25d and 25e.

Figure 5:
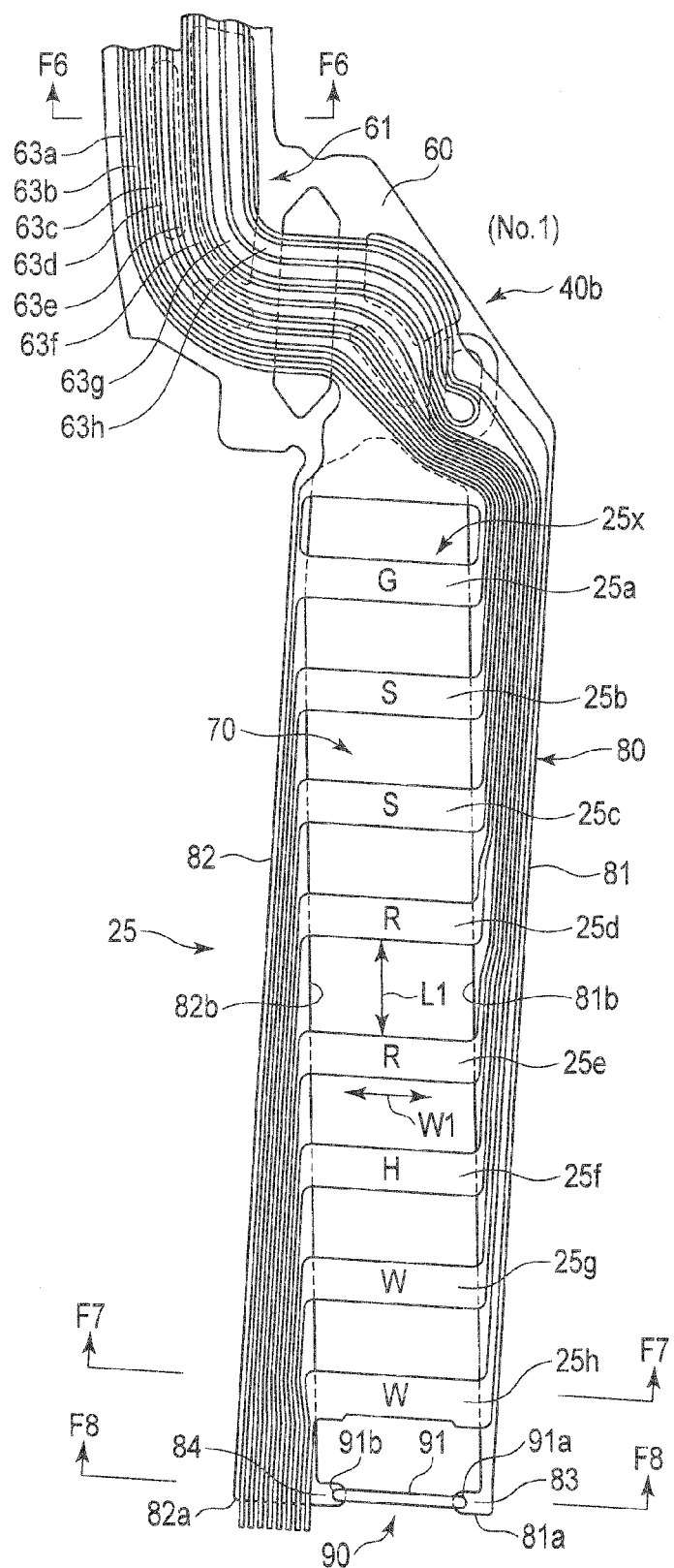
FIG. 5 is a plan view showing a metal base and tail terminals, etc., of a tail pad portion according to a first embodiment.

FIG. 5 is a plan view showing the tail pad portion 25 of the flexure tail 40b. The tail terminals 25a to 25h are arranged in the tail pad portion 25 to be spaced apart from each other in a longitudinal direction of the tail pad portion 25. Each of the tail terminals 25a to 25h extends in width direction (i.e., transverse direction) W1 of the tail pad portion 25. The tail terminals 25a to 25h are substantially parallel to each other. The tail terminals 25a to 25h are connected to the conductors 50a to 50h of the circuit board 50, respectively.

Although the order in which the tail terminals 25a to 25h are arranged is arbitrary, as an example, the ground tail terminal 25a, the sensor tail terminals 25b and 25c, the read tail terminals 25d and 25e, the heater tail terminal 25f, and the write tail terminals 25g and 25h are arranged in this order from the top of FIG. 5. Distance L1 between the read tail terminals 25d and 25e is greater than a distance between the other tail terminals.

Figure 6:
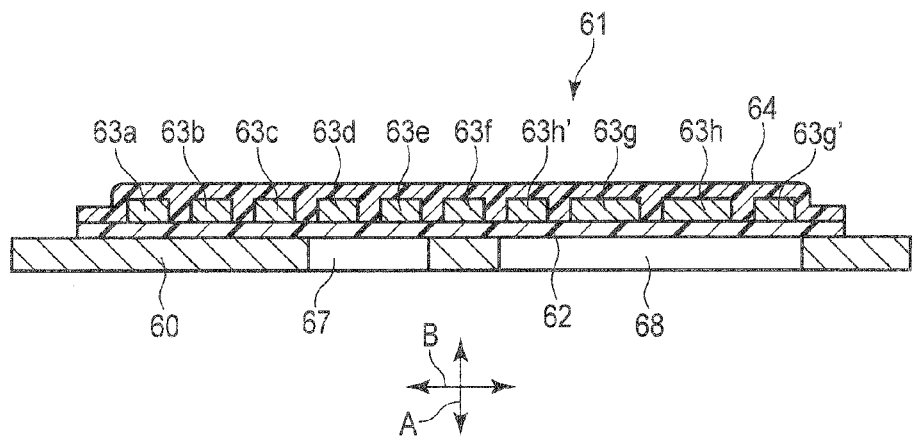
FIG. 6 is a cross-sectional view of the tail pad portion taken along line F6-F6 of FIG. 5.

FIG. 6 is a cross-sectional view of the flexure tail 40b taken along line F6-F6 of FIG. 5. In FIG. 6, double-headed arrow A indicates a thickness direction of the flexure tail 40b, and double-headed arrow B indicates a width direction (i.e., transverse direction) of the flexure tail 40b. The flexure 40 includes a metal base 60 made of a plate of austenitic stainless steel, for example, and a conductive circuit portion 61 formed along the metal base 60. The thickness of the metal base 60 is smaller than the thickness of the load beam 31. The thickness of the load beam 31 is, for example, 30 to 62 µm, and the thickness of the metal base 60 is, for example, 18 µm (12 to 25 µm).

The conductive circuit portion 61 includes an insulating layer 62 formed on the metal base 60, conductors 63a to 63h formed on the insulating layer 62, and a cover layer 64. The conductors 63a to 63h are made of, for example, plating copper (pure copper), and formed to have a predetermined pattern along the insulating layer 62 by etching. As another method of forming the conductors 63a to 63h, a layer of copper may be formed by a layer formation process such as plating on an insulating layer subjected to masking in a predetermined pattern, for example.

Although the order in which the conductors 63a to 63h are arranged is arbitrary, as an example, the ground conductor 63a, the sensor conductors 63b and 63c, the read conductors 63d and 63e, the heater conductor 63f, and the write conductors 63g and 63h are arranged in this order from the left of FIG. 6. In an example of the conductive circuit portion 61, branch conductors 63g' and 63h' which constitute an interleaved circuit are also included. Openings 67 and 68 are formed in the metal base 60. The openings 67 and 68 improve the electrical characteristics between the read conductors 63d and 63e and the write conductors 63g and 63h.

The ground conductor 63a is grounded to the metal base 60. The sensor conductors 63b and 63c are connected to the sensor which detects displacement of the slider 21. The read conductors 63d and 63e are connected to the MR elements of the slider 21. The heater conductor 63f is connected to the heater of the slider 21. The write conductors 63g and 63h are connected to the magnetic coil of the slider 21.

Each of the insulating layer 62 and the cover layer 64 is formed of an electrically insulating material such as polyimide. The thickness of the insulating layer 62 is, for example, 10 µm (5 to 20 µm). The thickness of each of the conductors 63a to 63h is, for example, 10 µm (4 to 15 µm). The thickness of the cover layer 64 is, for example, 5 µm (2 to 10 µm). Note that in FIG. 5, in order to facilitate understanding of the structure of the tail pad portion 25, the insulating layer 62 and the cover layer 64 are omitted, and the metal base 60, the tail terminals 25a to 25h, and the conductors 63a to 63h are shown.

Figure 7:
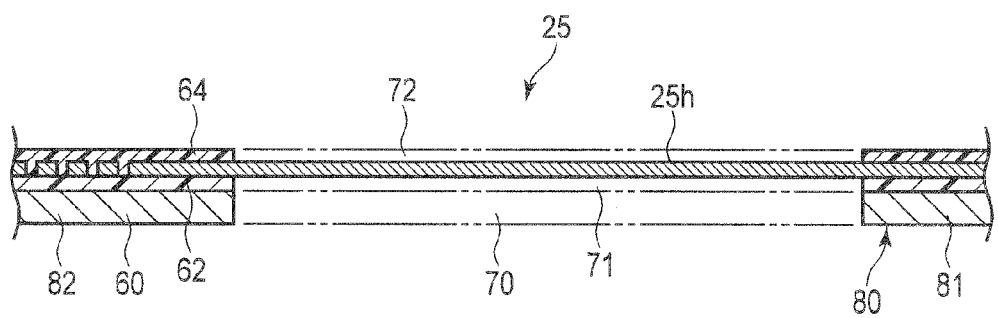
FIG. 7 is a cross-sectional view of the tail pad portion taken along line F7-F7 of FIG. 5.
Figure 8:
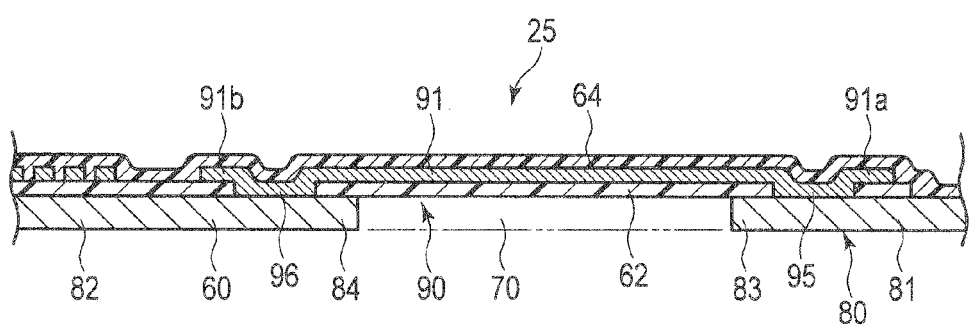
FIG. 8 is a cross-sectional view of the tail pad portion taken along line F8-F8 of FIG. 5.

FIG. 7 is a cross-sectional view of the tail pad portion 25 taken along line F7-F7 of FIG. 5. FIG. 8 is a cross-sectional view of an end portion of the tail pad portion 25 taken along line F8-F8 of FIG. 5.

As shown in FIGS. 7 and 8, an opening 70 is formed in the metal base 60. Openings 71 and 72 are formed in the insulating layer 62 and the cover layer 64, respectively, of a portion where the tail terminals 25a to 25h are arranged. Each of the tail terminals 25a to 25h traverses the openings 70, 71, and 72, and is exposed at the interior of the openings 70, 71, and 72. The tail terminals 25a to 25h are laid over the conductors 50a to 50h of the circuit board 50, and joined to the conductors 50a to 50h by bonding means such as ultrasonic bonding. In this way, mechanical and electrical connection between the tail terminals 25a to 25h and the circuit board 50 is established.

Figure 9:
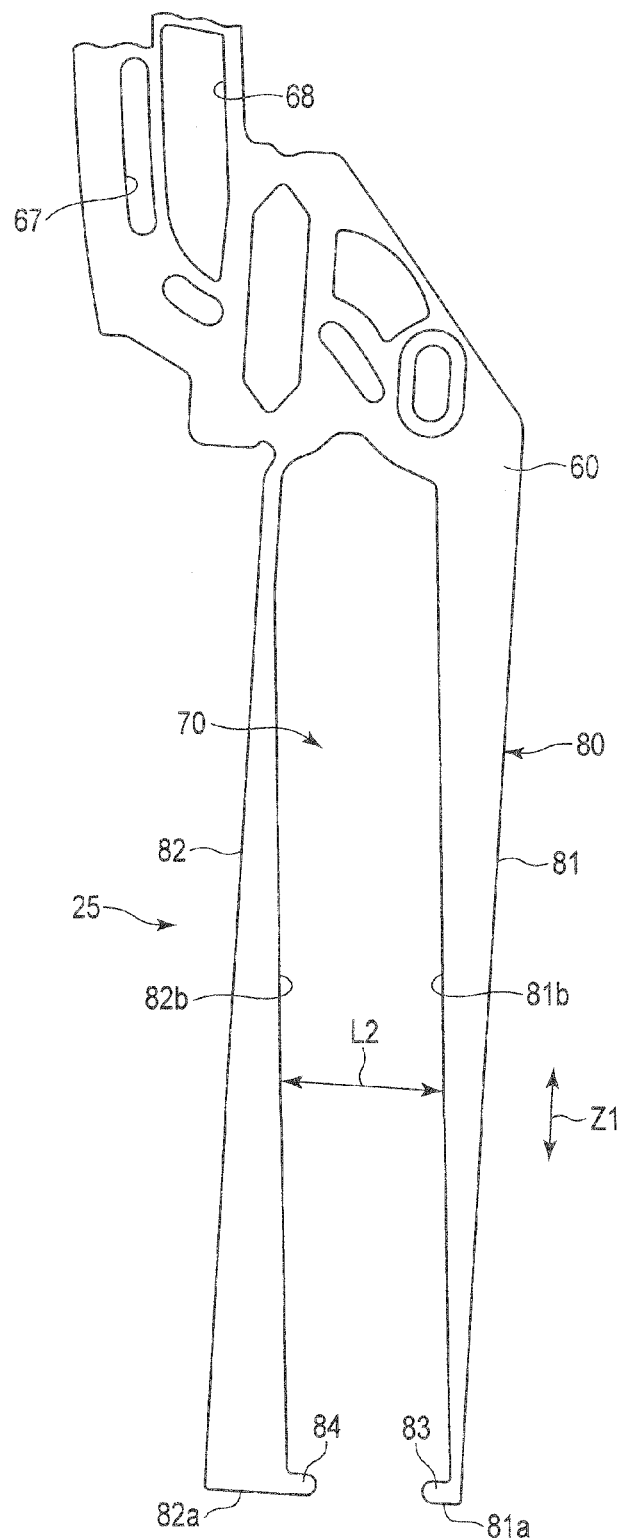
FIG. 9 is a plan view of the metal base of the tail pad portion shown in FIG. 5.

FIG. 9 shows a part of the metal base 60 which constitutes the tail pad portion 25. A frame structure 80 is formed in the metal base 60 of the tail pad portion 25. The frame structure 80 includes a first frame 81 and a second frame 82, and is formed to be bifurcated. The opening 70 is formed between the first frame 81 and the second frame 82. Each of the first frame 81 and the second frame 82 extends in a longitudinal direction (shown by arrow Z1) of the tail pad portion 25. A distal end 81a of the first frame 81 and a distal end 82a of the second frame 82 are separated from each other.

The first frame 81 is formed to be tapered having its width reduced toward the distal end 81a. The second frame 82 is formed to be reverse-tapered having its width increased toward the distal end 82a. An inner surface 81b of the first frame 81 and an inner surface 82b of the second frame 82 are substantially parallel to each other, and extend in the longitudinal direction (shown by arrow Z1) of the tail pad portion 25. Distance L2 between the first frame 81 and the second frame 82 is substantially constant in a longitudinal direction of the frame structure 80.

As shown in FIGS. 5, 8, and 9, extending portions 83 and 84 are formed on the distal end 81a of the first frame 81 and the distal end 82a of the second frame 82, respectively. A pair of extending portions 83 and 84 protrudes in the direction of approaching each other.

Figure 10:
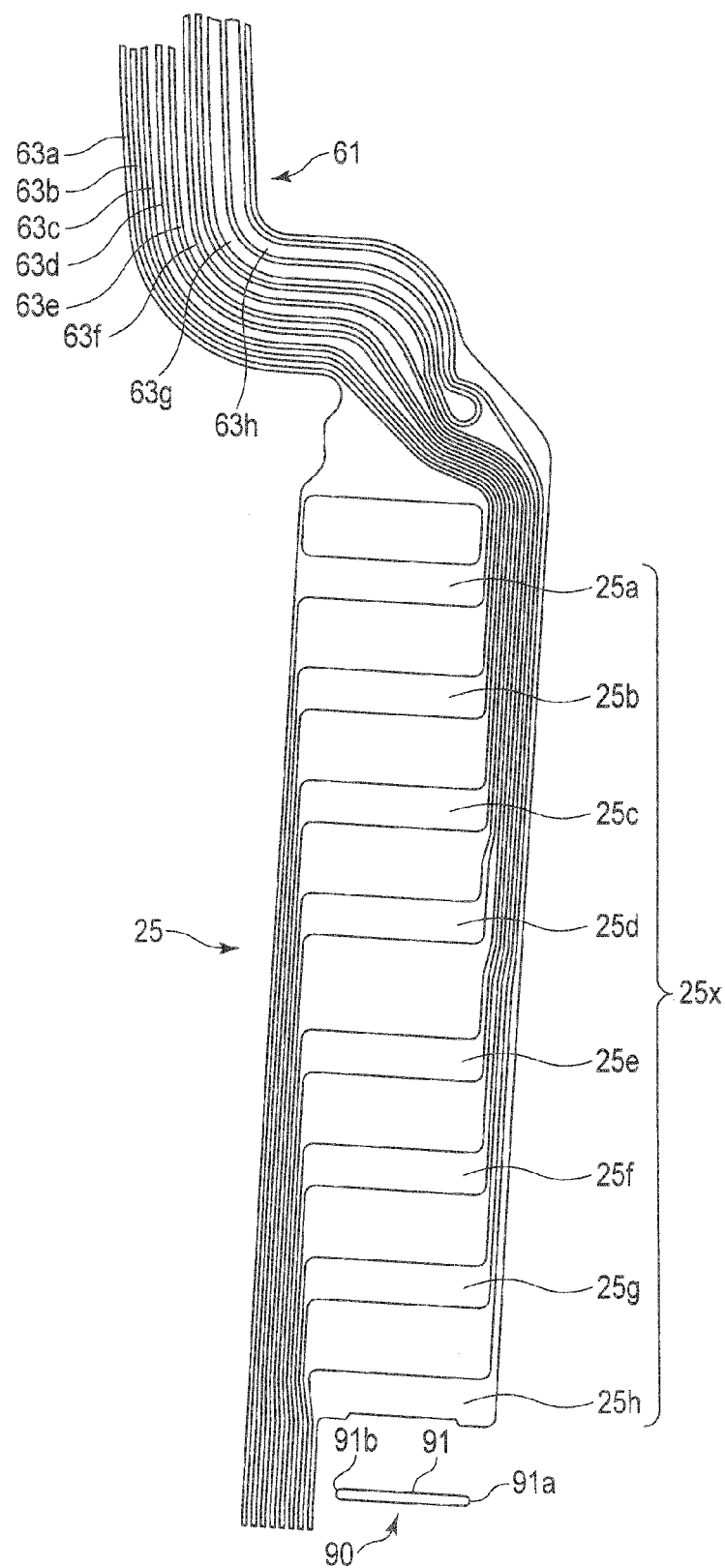
FIG. 10 is a plan view of the tail terminals and conductors of the tail pad portion shown in FIG. 5.

FIG. 10 illustrates the tail terminals 25a to 25h which constitute the tail pad portion 25, and the conductors 63a to 63h which are connected to the tail terminals 25a to 25h. The ground tail terminal 25a is electrically connected to the conductor 63a. The sensor tail terminals 25b and 25c are electrically connected to the conductors 63b and 63c. The read tail terminals 25d and 25e are electrically connected to the conductors 63d and 63e. The heater tail terminal 25f is electrically connected to the conductor 63f. The write tail terminals 25g and 25h are electrically connected to the conductors 63g and 63h.

As shown in FIGS. 5 and 8, a bridge portion 90 having conductivity is provided between the extending portion 83 of the first frame 81 and the extending portion 84 of the second frame 82. The bridge portion 90 of this embodiment is constituted of one bridge member 91, and the first frame 81 and the second frame 82 are electrically connected to each other by means of the bridge member 91. The bridge member 91 is formed near a distal end of the frame structure 80, that is, at a place that is closer to the distal ends 81a and 82a of the frames 81 and 82 than it is to the tail terminal group 25x. The first frame 81 and the second frame 82 are part of the metal base 60. Accordingly, the bridge member 91 is electrically connected to the ground conductor 63a via the first frame 81 and the second frame 82.

The bridge member 91 is made of plating copper (pure copper), which is the same material as the tail terminals 25a to 25h, and formed by a plating step, which is the same process as that adopted for the tail terminals 25a to 25h. That is, the bridge member 91 is formed to have the same height as the tail terminals 25a to 25h, and formed at a place which is different from where the tail terminals 25a to 25h are formed (i.e., a place which does not overlap the tail terminals 25a to 25h). Accordingly, it is possible to prevent the bridge member 91 from being a cause of an electrical short when the tail terminals 25a to 25h and the conductors 50a to 50h of the circuit board 50 are joined by ultrasonic bonding. The bridge member 91 is covered by the insulating layer 62 and the cover layer 64. Note that the material of the bridge member 91 may be a metal (for example, rolled copper) which is different from the material of the tail terminals 25a to 25h.

As shown in FIG. 8, connection portions 95 and 96 formed by plating are provided at both ends 91a and 91b of the bridge member 91. The first frame 81 and the second frame 82 are electrically connected to each other via the bridge member 91 comprising the connection portions 95 and 96. The bridge member 91 is arranged to be substantially parallel to the tail terminals 25a to 25h. Furthermore, the bridge member 91 extends in width direction W1 (FIG. 5) of the tail pad portion 25, that is, in the direction of traversing the opening 70 of the frame structure 80. The bridge member 91 of the present embodiment is arranged near the distal ends 81a and 82b of the frames 81 and 82. Accordingly, the bridge member 91 of the present embodiment is advantageous in arranging it in a limited space of the tail pad portion 25 as compared to the case of arranging the bridge member 91 between the tail terminals.

Figure 11:
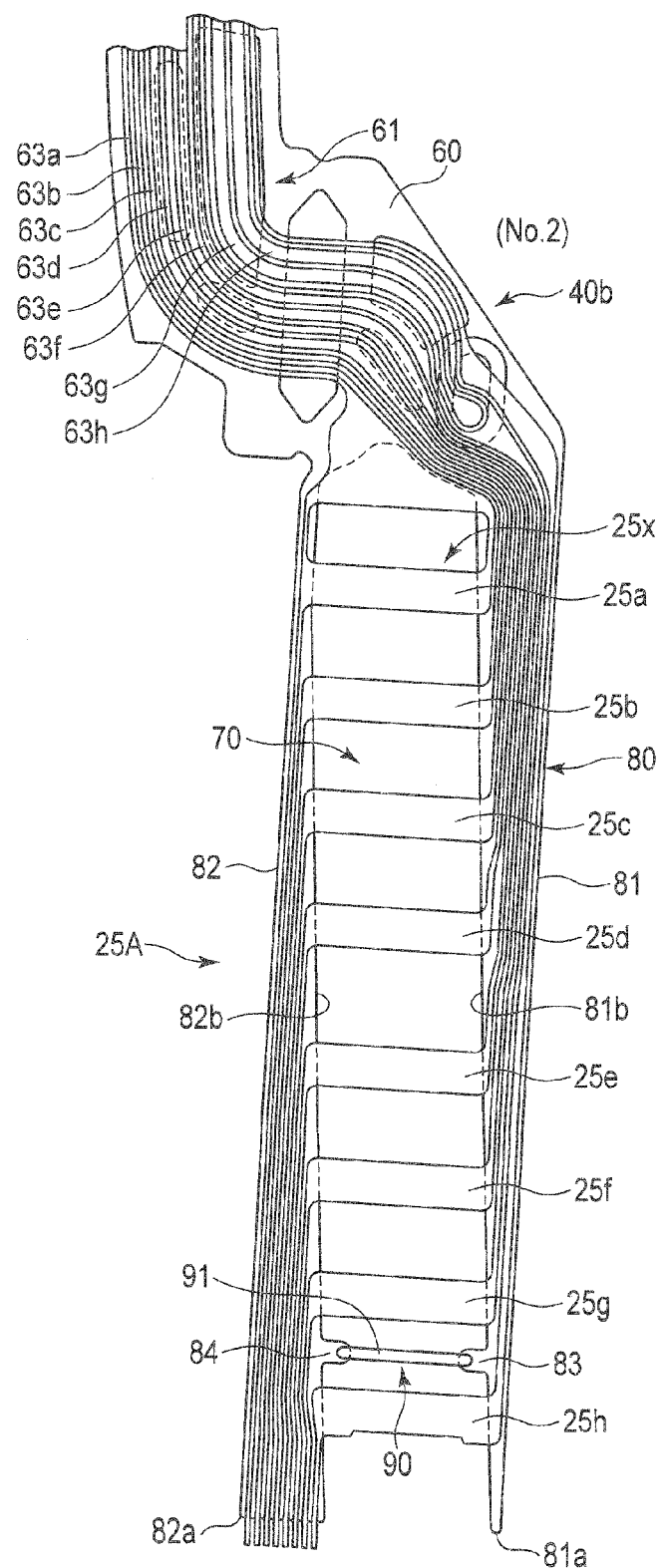
FIG. 11 is a plan view showing a metal base and tail terminals, etc., of a tail pad portion according to a second embodiment.

FIG. 11 shows a tail pad portion 25A of a second embodiment. In the tail pad portion 25A of the present embodiment, a bridge member 91 is arranged between write tail terminals 25g and 25h. That is, the bridge member 91 is arranged between only the selected specific tail terminals 25g and 25h of the entire tail terminals which constitute a tail terminal group 25x. Since structures other than the above have commonality with the structures of the tail pad portion 25 of the first embodiment, common reference numbers are assigned to parts that are common to the two embodiments, and explanations of them are omitted. Both of the bridge members 91 of the first and second embodiments are arranged at a position closer to the distal end of the frame structure 80 than they are to the center in the longitudinal direction of the tail pad portion 25.

Figure 12:
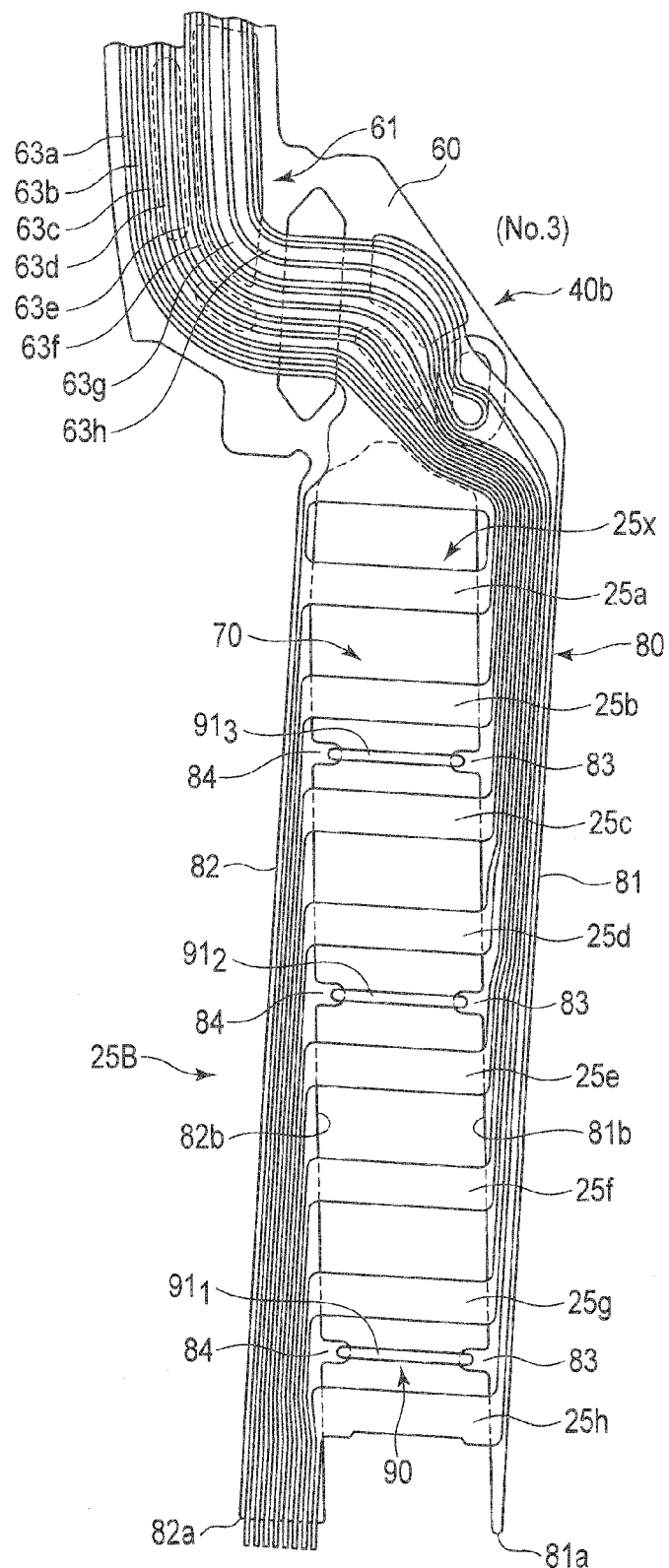
FIG. 12 is a plan view showing a metal base and tail terminals, etc., of a tail pad portion according to a third embodiment.

FIG. 12 shows a tail pad portion 25B of a third embodiment. A bridge portion 90 of the tail pad portion 25B of this embodiment comprises three bridge members $91_1$, $91_2$, and $91_3$. The first bridge member $91_1$ is arranged between write tail terminals 25g and 25h. The second bridge member $91_2$ is arranged between read tail terminals 25d and 25e. Further, the third bridge member $91_3$ is arranged between sensor tail terminals 25b and 25c. These bridge members $91_1$, $91_2$, and $91_3$ are formed at positions which do not overlap the tail terminals 25a to 25h in the thickness direction. In other words, each of the bridge members $91_1$, $91_2$, and $91_3$ is arranged between only the selected specific tail terminals of the entire tail terminals 25a to 25h which constitute a tail terminal group 25x. Since structures other than the above have commonality with the structures of the tail pad portion 25 of the first embodiment, common reference numbers are assigned to parts that are common to the two embodiments, and explanations of them are omitted.

Figure 13:
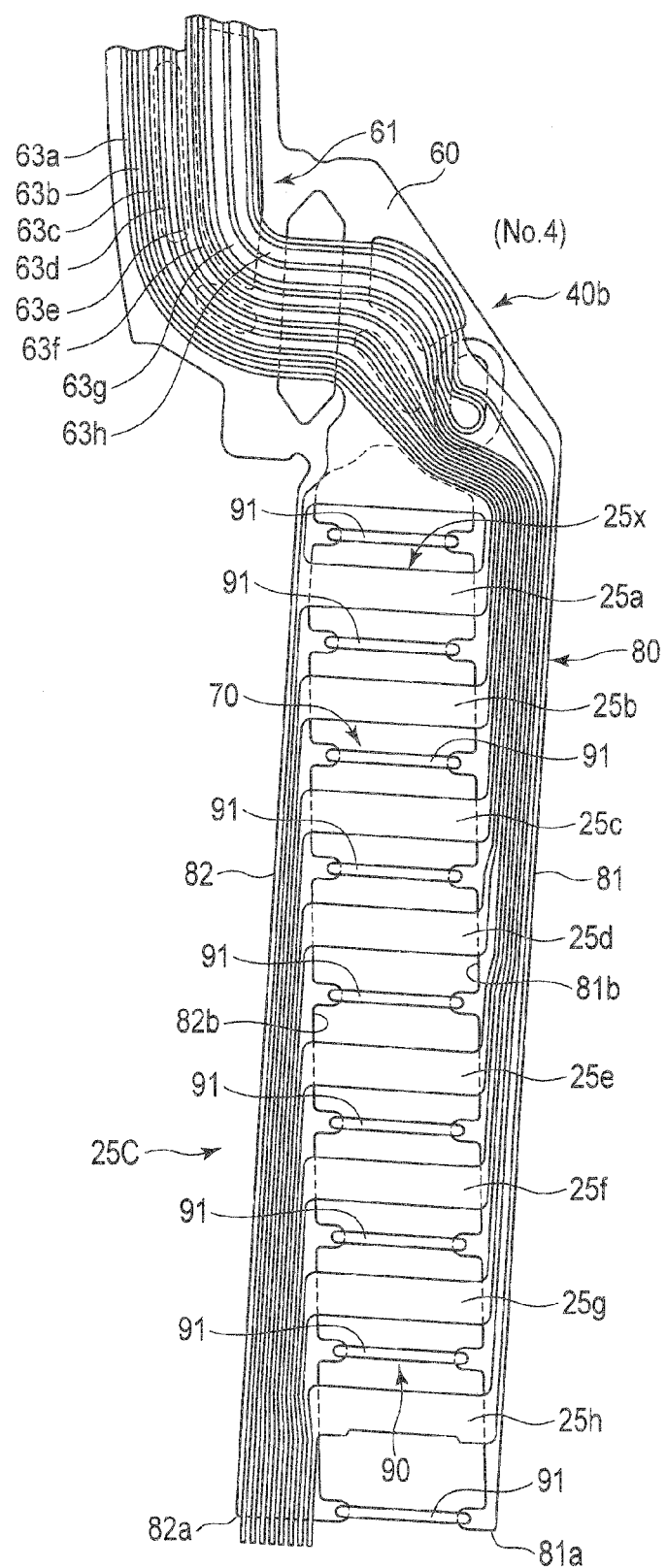
FIG. 13 is a plan view showing a metal base and tail terminals, etc., of a tail pad portion according to a fourth embodiment.

FIG. 13 shows a tail pad portion 25C of a fourth embodiment. In the present embodiment, each of bridge members 91 is arranged between all adjacent tail terminals. A bridge member 91 is also provided between distal ends 81a and 82a of frame portions 81 and 82. These bridge members 91 are formed at positions which do not overlap tail terminals 25a to 25h in the thickness direction. Since structures other than the above have commonality with the structures of the tail pad portion 25 of the first embodiment, common reference numbers are assigned to parts that are common to the two embodiments, and explanations of them are omitted.

Figure 14:
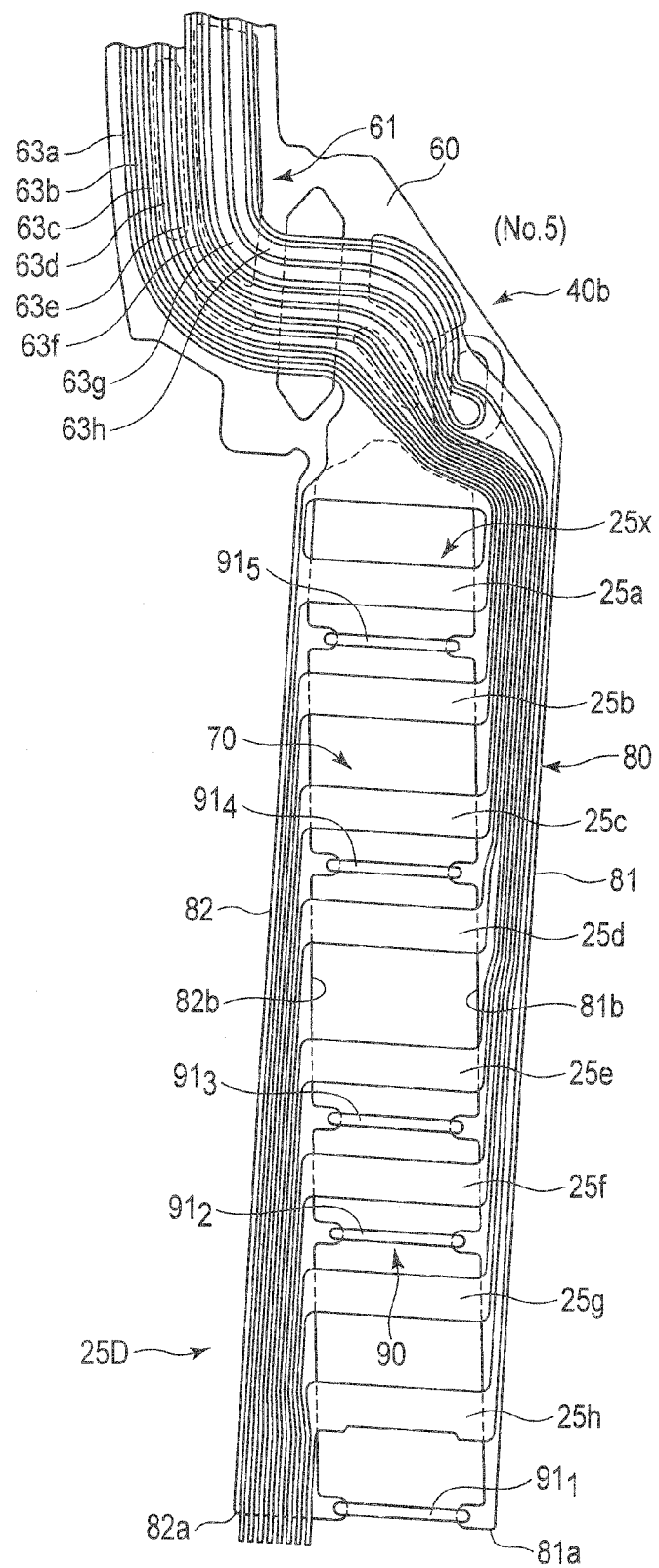
FIG. 14 is a plan view showing a metal base and tail terminals, etc., of a tail pad portion according to a fifth embodiment.

FIG. 14 shows a tail pad portion 25D of a fifth embodiment. A bridge portion 90 of this embodiment comprises five bridge members $91_1$ to $91_5$. A first bridge member $91_1$ is provided on distal ends 81a and 82a of frame portions 81 and 82. A second bridge member $91_2$ is arranged between a heater tail terminal 25f and a write tail terminal 25g. A third bridge member $91_3$ is arranged between a read tail terminal 25e and the heater tail terminal 25f. A fourth bridge member $91_4$ is arranged between a sensor tail terminal 25c and a read tail terminal 25d. Further, a fifth bridge member $91_5$ is arranged between a ground tail terminal 25a and a sensor tail terminal 25b. That is, each of the bridge members $91_1$ to $91_5$ is arranged between only the selected specific tail terminals of the entire tail terminals 25a to 25h which constitute a tail terminal group 25x. The bridge members $91_1$ to $91_5$ are formed at positions which do not overlap the tail terminals 25a to 25h in the thickness direction. Since structures other than the above have commonality with the structures of the tail pad portion 25 of the first embodiment, common reference numbers are assigned to parts that are common to the two embodiments, and explanations of them are omitted.

Figure 15:
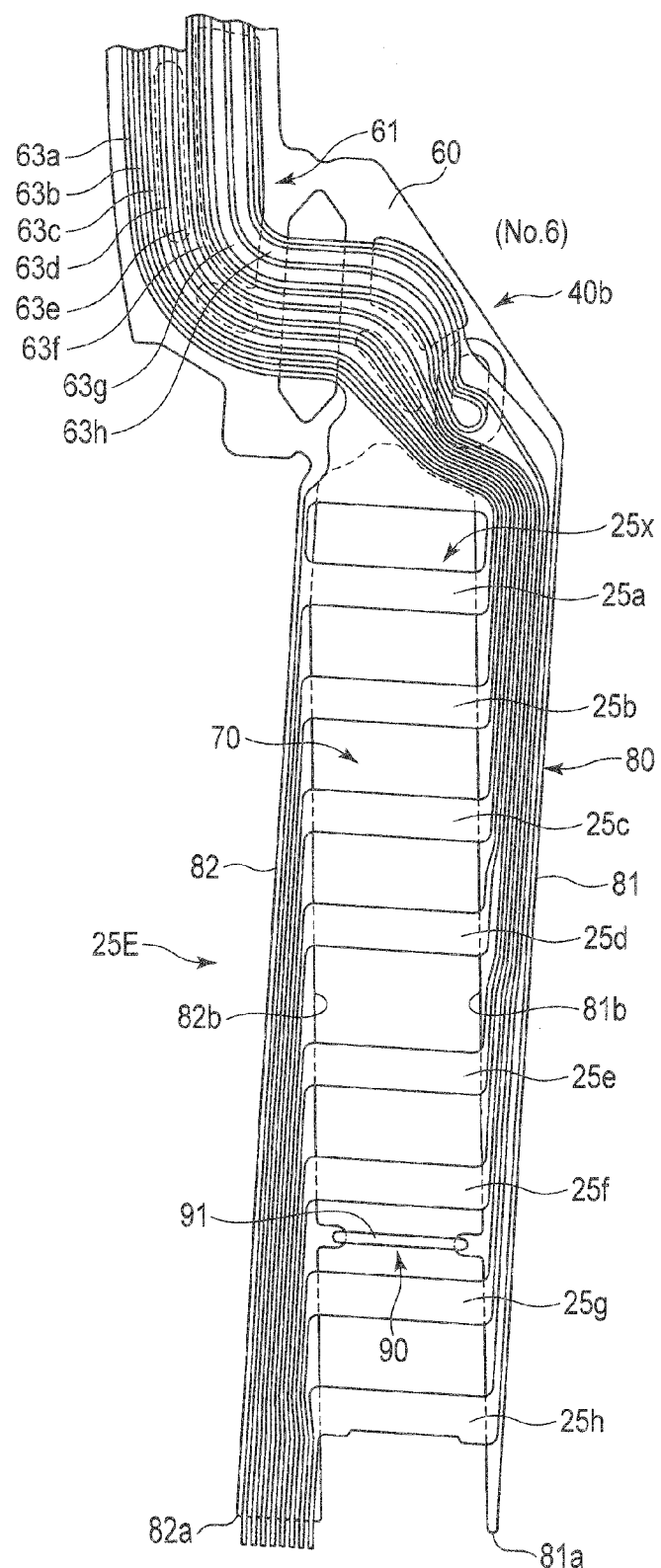
FIG. 15 is a plan view showing a metal base and tail terminals, etc., of a tail pad portion according to a sixth embodiment.

FIG. 15 shows a tail pad portion 25E of a sixth embodiment. In this embodiment, a bridge member 91 is arranged between a heater tail terminal 25f and a write tail terminal 25g. That is, the bridge member 91 is arranged between only the selected specific tail terminals 25f and 25g of the entire tail terminals 25a to 25h which constitute a tail terminal group 25x. Since structures other than the above have commonality with the structures of the tail pad portion 25 of the first embodiment, common reference numbers are assigned to parts that are common to the two embodiments, and explanations of them are omitted.

Figure 16:
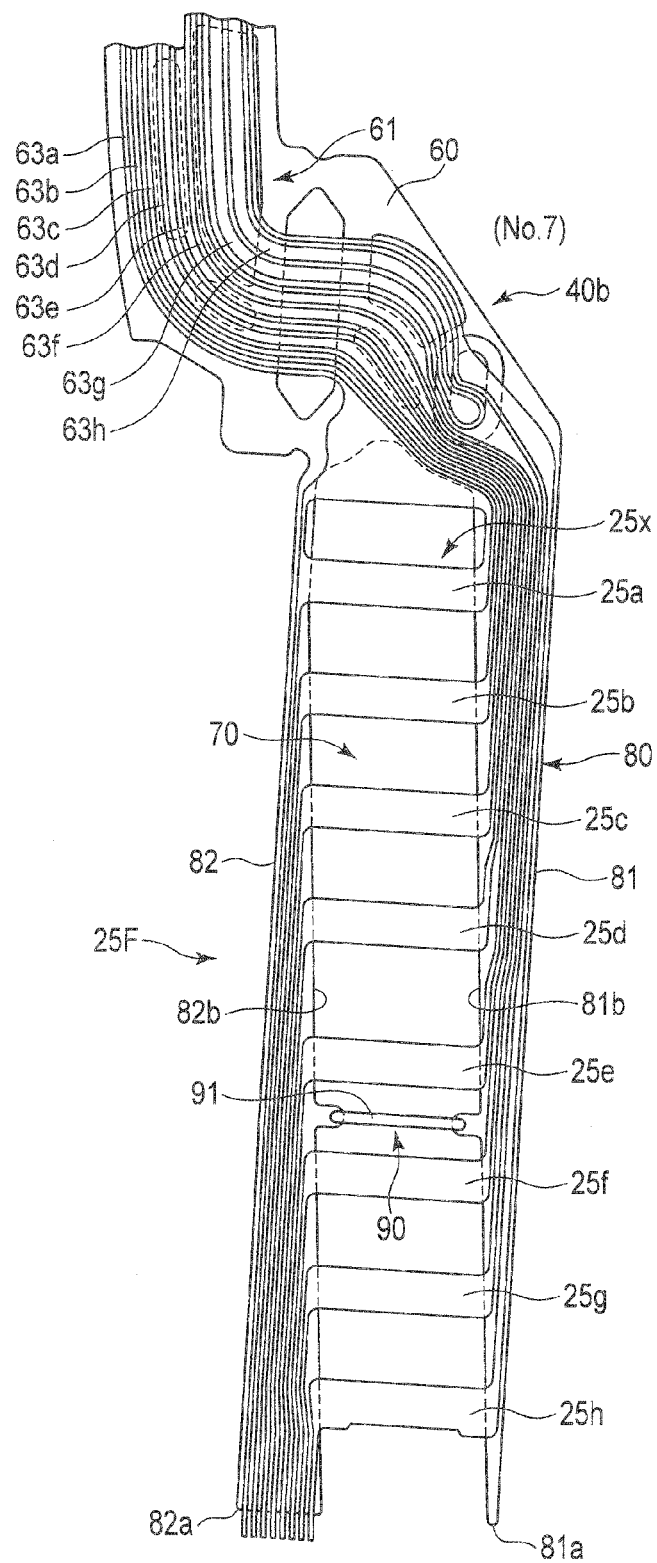
FIG. 16 is a plan view showing a metal base and tail terminals, etc., of a tail pad portion according to a seventh embodiment.

FIG. 16 shows a tail pad portion 25F of a seventh embodiment. In this embodiment, a bridge member 91 is arranged between a read tail terminal 25e and a heater tail terminal 25f. Also in this case, the bridge member 91 is arranged between only the selected specific tail terminals 25e and 25f of the entire tail terminals 25a to 25h. Since structures other than the above have commonality with the structures of the tail pad portion 25 of the first embodiment, common reference numbers are assigned to parts that are common to the two embodiments, and explanations of them are omitted.

Figure 17:
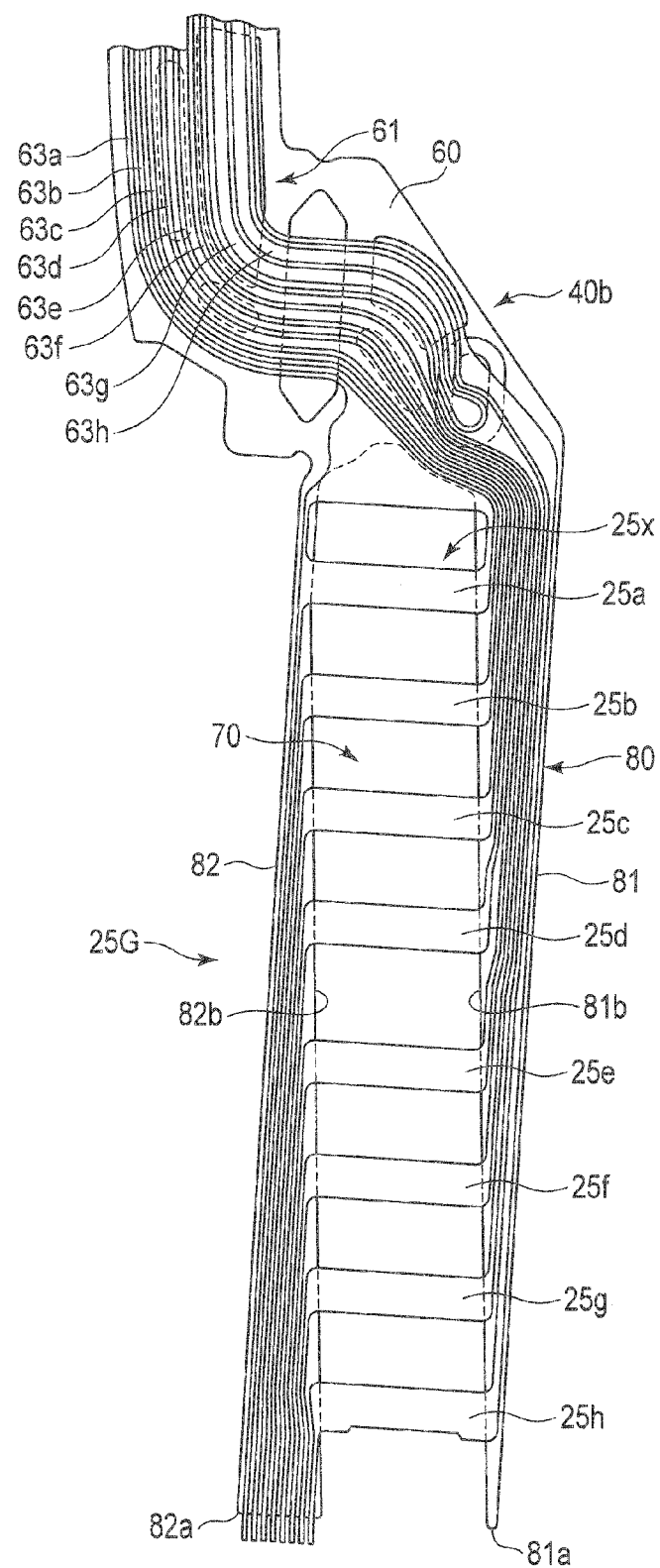
FIG. 17 is a plan view showing a metal base and tail terminals, etc., of a tail pad portion of a comparative example.

FIG. 17 shows a tail pad portion 25G of a comparative example. A bridge portion 90 is not provided in the tail pad portion 25G. Since structures other than the above have commonality with the structures of the tail pad portion 25 of the first embodiment, common reference numbers are assigned to parts that are common to the comparative example and the first embodiment, and explanations of them are omitted.

Figure 18:
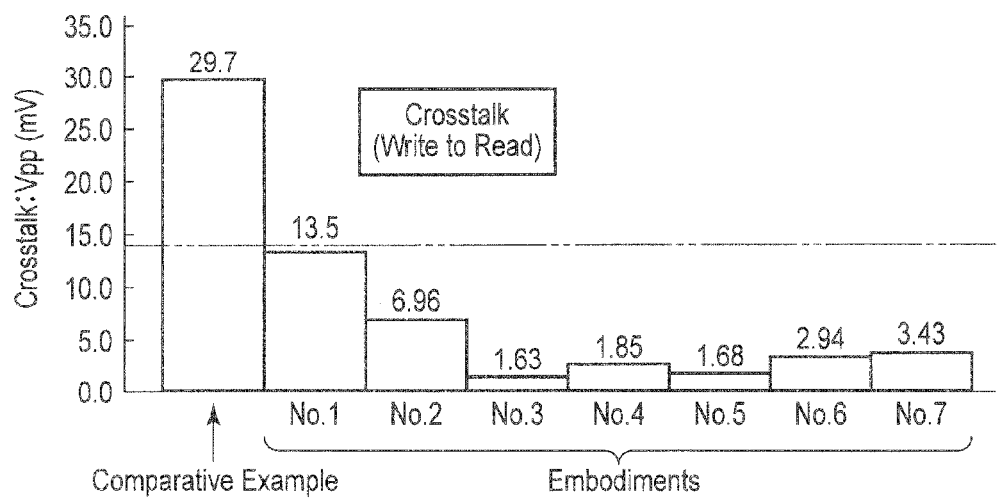
FIG. 18 is a graph showing crosstalk of each of flexures having the tail pad portions of the first to seventh embodiments and the tail pad portion of the comparative example.

FIG. 18 is a graph showing crosstalk of flexures comprising the tail pad portions 25 and 25A to 25F of the first and the second to seventh embodiments, and a flexure comprising the tail pad portion 25G of the comparative example. Crosstalk is a leakage current which is detected in the read conductor when a pulse signal of 400 mV is input to the write conductor. The magnitude of the crosstalk is represented by the differential voltage (Vpp) between a positive peak and a negative peak. If the crosstalk becomes greater than 14 mV, it becomes a cause of the electrical characteristics of a practical disk drive to be adversely affected. Since the crosstalk in the comparative example is 29.7 mV, which is more than double the permissible value of 14 mV, the comparative example leaves room for improvement.

In contrast, the crosstalk in the first embodiment is 13.5 mV, which is less than half the value of the comparative example, and is smaller than the permissible value of 14 mV. Thus, the crosstalk in the first embodiment is one which does not present any problem practically. The crosstalk in the second embodiment is 6.96 mV, which is approximately half the permissible value of 14 mV, so that a favorable result is obtained. The crosstalk in the third embodiment is 1.63 mV, and a further favorable result is obtained. The values of the crosstalk of the fourth, fifth, sixth, and seventh embodiments are 1.85, 1.68, 2.94, and 3.43 mV, respectively, which are all greatly below the permissible value of 14 mV. Thus, the crosstalk in these embodiments does not present any problem practically.

Figure 19:
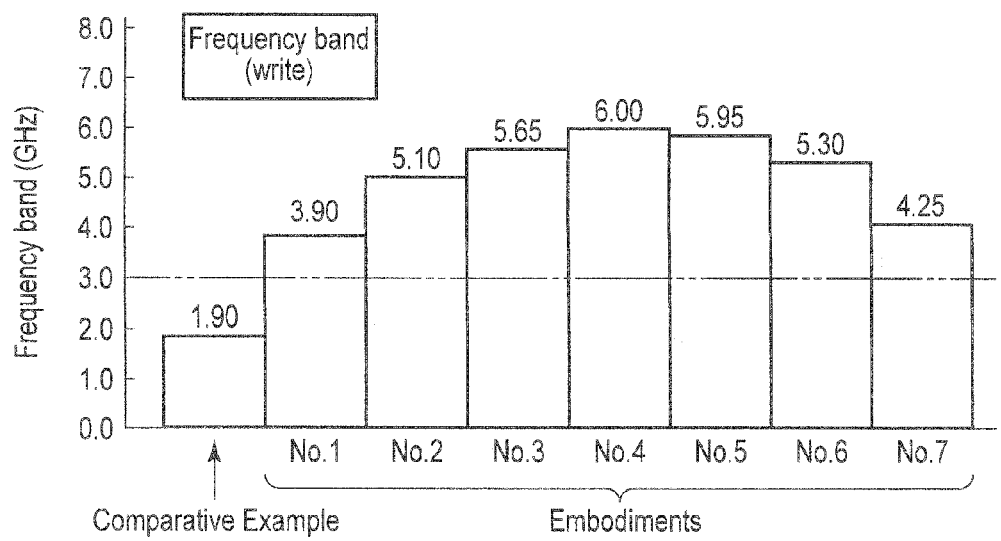
FIG. 19 is a graph showing a frequency band of each of the flexures having the tail pad portions of the first to seventh embodiments and the tail pad portion of the comparative example, respectively.

FIG. 19 is a graph showing a frequency band of flexures comprising the tail pad portions 25 and 25A to 25F of the first and the second to seventh embodiments, and a flexure comprising the tail pad portion 25G of the comparative example. The frequency band should preferably be high because the higher the frequency band is, the more the data items can be transmitted per unit time, and the target value is 3 GHz or more. The frequency band of the comparative example is 1.90 GHz, which is approximately 65% of the target value of 3 GHz, and thus the comparative example leaves room for improvement.

In contrast, the frequency band of the first embodiment is 3.90 GHz, which is 1.3 times more than the target value. The frequency band of the second embodiment is 5.10 GHz, which is 1.7 times more than the target value. The frequency band of the third embodiment is 5.65 GHz, which is 1.88 times more than the target value, and a further superior frequency response can be obtained. The frequency bands of the fourth, fifth, sixth, and seventh embodiments are 6.00, 5.95, 5.30, and 4.25 GHz, respectively, and a frequency response which greatly exceeds the target value can be obtained in all of these embodiments. With respect to the frequency band, it has been found that the more the bridge member is provided, the better the result becomes.

As described above, in the first to seventh embodiments, since the first frame 81 and the second frame 82 which constitute the frame structure 80 of the metal base 60 in the tail pad portion are electrically connected to each other by means of the bridge member 91, the crosstalk can be reduced to a practically insignificant level, and a flexure 40 having excellent electrical properties can be obtained.

Furthermore, in the embodiments shown in FIGS. 11, 12, and 14 to 16, the bridge member 91 is arranged between only the selected specific tail terminals of the entire tail terminals 25a to 25h which constitute the tail terminal group 25x. Accordingly, these embodiments are more advantageous in arranging the bridge member 91 in a limited narrow space of the tail pad portion as compared to the case of arranging each bridge member 91 between all of the adjacent tail terminals.

Needless to say, in carrying out the present invention, as well as the form of the suspension and the flexure, the shape of the metal base and the conductors, the numbers of conductors and tail terminals, and the first frame and the second frame which constitute the frame structure may be modified variously. Also, the bridge member may be provided at a place other than those described in the embodiments. In other words, it is sufficient if the bridge member is arranged near a distal end of the frame structure or between adjacent tail terminals. Furthermore, as the material of the bridge member, a metal different from that used for the tail terminals may be employed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A flexure of a disk drive suspension with a magnetic head mounted therein, the flexure comprising a metal base, a conductive circuit portion formed along the metal base, and a tail pad portion formed in a flexure tail at an end of the flexure, and the tail pad portion comprising:
    a frame structure including a first frame and a second frame which are a part of the metal base and extend in a longitudinal direction of the tail pad portion, and in which an opening is formed between the first frame and the second frame, a distal end of the first frame and a distal end of the second frame being separated from each other;
    a tail terminal group comprising a plurality of tail terminals arranged in the tail pad portion, the tail terminals being arranged to be spaced apart from each other in the longitudinal direction of the tail pad portion, each of the tail terminals traversing the opening of the frame structure; and
    a bridge portion including at least one conductive bridge member which electrically connects the first frame and the second frame to each other, the at least one bridge member being arranged between the tail terminals which are adjacent to each other between the first frame and the second frame,
    wherein the at least one bridge member is made of a metal which is the same material as the tail terminals.

2. The flexure of claim 1, wherein the bridge member is formed at a position closer to the distal ends of the first frame and the second frame than it is to the tail terminal group.

3. The flexure of claim 1, wherein the at least one bridge member is arranged between selected specific tail terminals of all of the tail terminals which constitute the tail terminal group.

4. The flexure of claim 3, wherein the tail terminal group includes a pair of write tail terminals, and the at least one bridge member is arranged between the write tail terminals.

5. The flexure of claim 3, wherein the tail terminal group includes a pair of read tail terminals, and the at least one bridge member is arranged between the read tail terminals.

6. The flexure of claim 3, wherein the tail terminal group includes a pair of sensor tail terminals, and the at least one bridge member is arranged between the sensor tail terminals.

7. The flexure of claim 1, wherein each bridge member is arranged between all adjacent tail terminals which constitute the tail terminal group.

8. A flexure of a disk drive suspension with a magnetic head mounted therein, the flexure comprising a metal base, a conductive circuit portion formed along the metal base, and a tail pad portion formed in a flexure tail at an end of the flexure, and the tail pad portion comprising:
- a frame structure including a first frame and a second frame which are a part of the metal base and extend in a longitudinal direction of the tail pad portion, and in which an opening is formed between the first frame and the second frame, a distal end of the first frame and a distal end of the second frame being separated from each other;
- a tail terminal group comprising a plurality of tail terminals arranged in the tail pad portion, the tail terminals being arranged to be spaced apart from each other in the longitudinal direction of the tail pad portion, each of the tail terminals traversing the opening of the frame structure; and
- a bridge portion including at least one conductive bridge member which electrically connects the first frame and the second frame to each other, the at least one bridge member being arranged between the tail terminals which are adjacent to each other between the first frame and the second frame,
wherein the at least one bridge member is made of a metal which is the same material as the tail terminals, and
wherein the bridge member is formed at a position avoiding positions where the tail terminals are arranged.

9. The flexure of claim 8, wherein the bridge member is formed at a position closer to the distal ends of the first frame and the second frame than it is to the tail terminal group.

10. A flexure of a disk drive suspension with a magnetic head mounted therein, the flexure comprising a metal base, a conductive circuit portion formed along the metal base, and a tail pad portion formed in a flexure tail at an end of the flexure, and the tail pad portion comprising:
- a frame structure including a first frame and a second frame which are a part of the metal base and extend in a longitudinal direction of the tail pad portion, and in which an opening is formed between the first frame and the second frame, a distal end of the first frame and a distal end of the second frame being separated from each other;
- a tail terminal group comprising a plurality of tail terminals arranged in the tail pad portion, the tail terminals being arranged to be spaced apart from each other in the longitudinal direction of the tail pad portion, each of the tail terminals traversing the opening of the frame structure; and
- a bridge portion including at least one conductive bridge member which electrically connects the first frame and the second frame to each other, the at least one bridge member being arranged between the tail terminals which are adjacent to each other between the first frame and the second frame,
wherein the at least one bridge member is arranged between selected specific tail terminals of all of the tail terminals which constitute the tail terminal group, and
wherein the tail terminal group includes a pair of write tail terminals and a pair of read tail terminals, and the at least one bridge member is arranged between the pair of write tail terminals and the pair of read tail terminals.

11. The flexure of claim 10, wherein the tail terminal group includes a pair of sensor tail terminals, and the at least one bridge member is arranged between the pair of sensor tail terminals and the pair of read tail terminals.

12. The flexure of claim 11, wherein the at least one bridge member is arranged between the pair of sensor tail terminals and the pair of write tail terminals.

* * * * *